(12) United States Patent
Lee et al.

(10) Patent No.: US 8,077,128 B2
(45) Date of Patent: Dec. 13, 2011

(54) LIQUID CRYSTAL DISPLAY DEVICE

(75) Inventors: Su Woong Lee, Paju-si (KR); Young Min Jeong, Paju-si (KR)

(73) Assignee: LG. Display Co. Ltd., Seoul (KR)

( * ) Notice: Subject to any disclaimer, the term of this patent is extended or adjusted under 35 U.S.C. 154(b) by 509 days.

(21) Appl. No.: 12/331,990

(22) Filed: Dec. 10, 2008

(65) Prior Publication Data

US 2009/0251398 A1    Oct. 8, 2009

(30) Foreign Application Priority Data

Apr. 4, 2008  (KR) .................. 10-2008-0031571

(51) Int. Cl.
G09G 3/36    (2006.01)

(52) U.S. Cl. .......................... 345/87; 345/92

(58) Field of Classification Search .................. None
See application file for complete search history.

(56) References Cited

U.S. PATENT DOCUMENTS 7,355,575 B1 *  4/2008  Ota et al. .................. 345/87
7,646,439 B1 *  1/2010  Choi et al. ................ 349/27

* cited by examiner

*Primary Examiner* — Paul Huber
(74) *Attorney, Agent, or Firm* — Brinks Hofer Gilson & Lione

(57) ABSTRACT

A liquid crystal display device includes a liquid crystal display panel having liquid crystal cells, a gate driver for driving gate lines of the liquid crystal display panel, a data driver for driving a first to (2m+1)th data lines of the liquid crystal display panel, wherein the liquid crystal display panel includes first thin film transistors connected to odd numbered data lines arranged on each horizontal line in zigzag with reference to the odd numbered data lines, second thin film transistors connected to even numbered data lines arranged on each horizontal line in zigzag with reference to the even numbered data lines, pixel electrode connected to the first thin film transistor for having a first data signal supplied thereto through the odd numbered data lines, and a common electrode connected to the second thin film transistor for having a second data signal supplied thereto through the even numbered data line and forming a horizontal electric field together with the pixel electrode.

6 Claims, 6 Drawing Sheets

LIQUID CRYSTAL DISPLAY DEVICE

RELATED APPLICATIONS

This application claims the benefit of the Patent Korean Application No. P2008-031571, filed on Apr. 4, 2008, which are hereby incorporated by reference as if fully set forth herein.

BACKGROUND

1. Field of the Disclosure

The present disclosure relates to a liquid crystal display device, and more particularly, to a liquid crystal display device which can improve a picture quality.

2. Discussion of the Related Art

In general, the liquid crystal display device displays a picture by controlling a light transmittivity of liquid crystals having dielectric anisotropy with an electric field. The liquid crystal display device controls the light transmittivity of liquid crystals with the electric field for displaying the picture.

Of the liquid crystal display devices, a horizontal field type liquid crystal display device drives the liquid crystals in an in-plane switch mode with a horizontal electric field formed between pixel electrodes and a common electrode arranged in parallel on a lower substrate.

The horizontal field type liquid crystal display device is provided with a thin film transistor substrate and a color filter substrate, which are bonded to face each other, spacers for maintaining a cell gap between the two substrates, and the liquid crystals filled in the cell gap.

The color filter substrate is provided with a color filter for displaying colors, a black matrix for preventing light from leaking, and an alignment film coated thereon for orientation of the liquid crystals.

The thin film transistor substrate is provided with the pixel electrodes and the common electrode arranged in parallel for forming a pixel unit of horizontal electric field, thin film transistors connected to the pixel electrodes respectively, and the alignment film coated thereon for orientation of the liquid crystals.

Referring to FIG. 1, the horizontal filed type liquid crystal display device has a common voltage Vcom of a direct current supplied to the common electrode through a common line arranged parallel to a gate line, and a data voltage Vdata supplied to the pixel electrode for forming a voltage difference with the common voltage.

A related art common electrode supplies a fixed common voltage regardless of positions of liquid crystal cells. In this case, if there is a difference of pixel voltages charged in the liquid crystal cells at different positions caused by a kick back voltage, a line resistance of the common line, or the like, drop of the picture quality is takes place, such as flicker, because the common voltage can not be adjusted for the different positions.

BRIEF SUMMARY

A liquid crystal display device includes a liquid crystal display panel having liquid crystal cells, a gate driver for driving gate lines of the liquid crystal display panel, a data driver for driving a first to (2m+1)th data lines of the liquid crystal display panel, wherein the liquid crystal display panel includes first thin film transistors connected to odd numbered data lines arranged on each horizontal line in zigzag with reference to the odd numbered data lines, second thin film transistors connected to even numbered data lines arranged on each horizontal line in zigzag with reference to the even numbered data lines, pixel electrode connected to the first thin film transistor for having a first data signal supplied thereto through the odd numbered data lines, and a common electrode connected to the second thin film transistor for having a second data signal supplied thereto through the even numbered data line and forming a horizontal electric field together with the pixel electrode.

Thus, the liquid crystal display device of the present disclosure can reduce power consumption as well as a cost of the data driver because the reference voltage VDD required for generation of the data voltage can be reduced by ½ of the related art. A difference of charged voltages can be compensated for different position of the liquid crystal cells thereby permitting the picture quality from becoming poor, such as flicker. Moreover, the liquid crystal display device of the present invention can dispense with a separate common line to improve an aperture.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
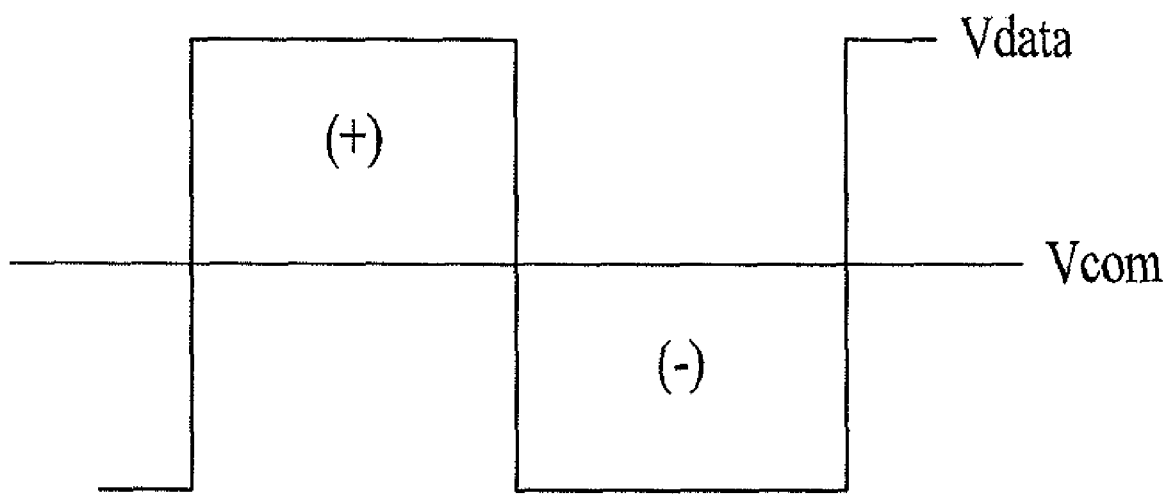
FIG. 1 is a sectional view illustrating waveforms of a data voltage and a common voltage of a related art horizontal field type liquid crystal display device.
Figure 2:
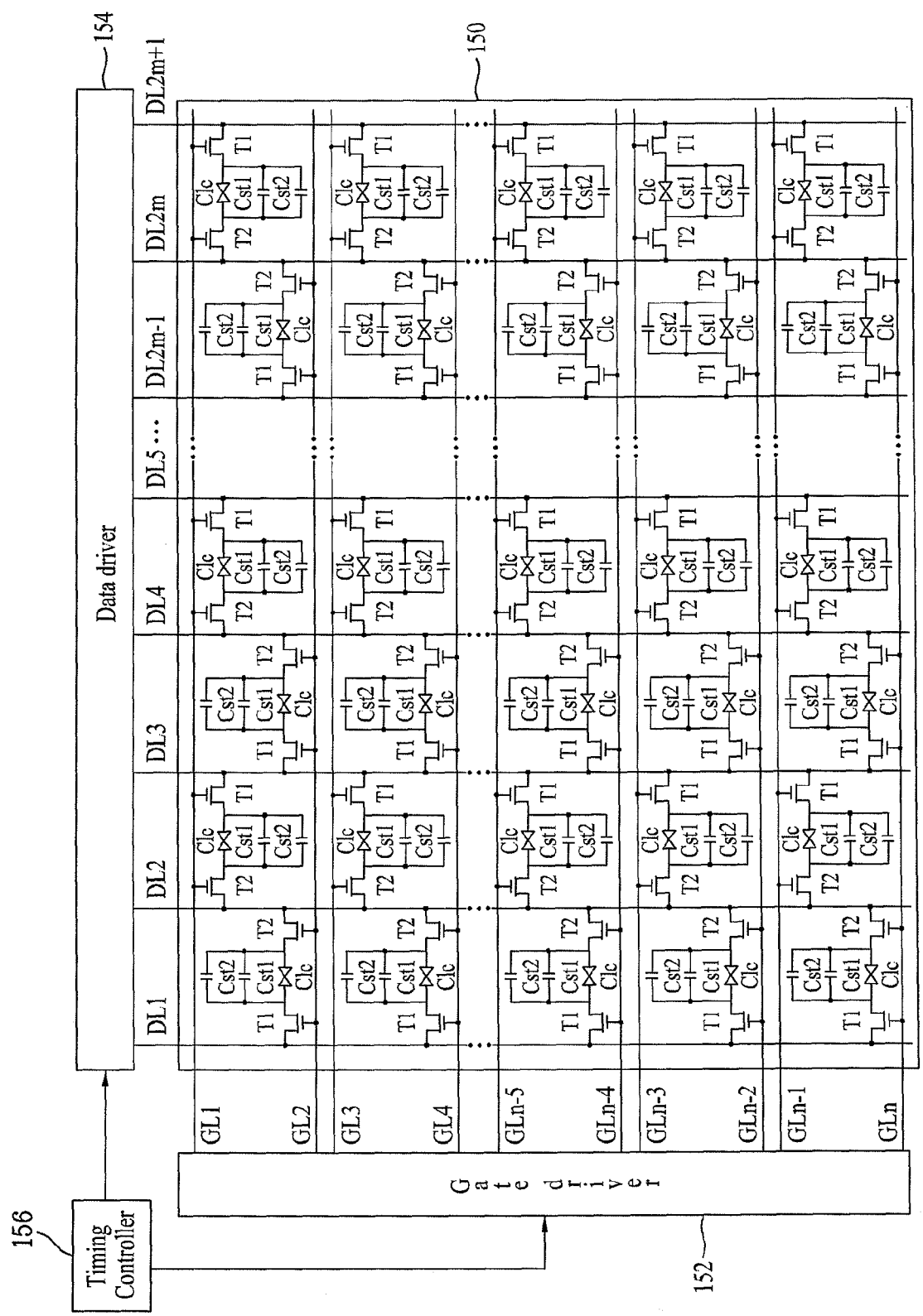
FIG. 2 is a circuit diagram illustrating a horizontal field type liquid crystal display device in accordance with an embodiment.

FIG. 2 is a circuit diagram illustrating a horizontal field type liquid crystal display device in accordance with an embodiment.

Referring to FIG. 2, the liquid crystal display device includes a liquid crystal display panel 150 having liquid crystal cells arranged in a matrix, a gate driver 152 for driving gate lines GL1~GLn of the liquid crystal display panel 150, a data driver 154 for driving data lines DL1~DL2m+1 of the liquid crystal display panel 150, and a timing controller 156 for controlling the gate driver 152 and the data driver 154.

The timing controller 156 generates a plurality of control signals to control driving timings of the gate driver 152 and data driver 154, and supplies pixel data to the data driver 104. In particular, the timing controller 156 divides pixel data of one horizontal line into odd numbered pixel data and even numbered pixel data and supplies the odd numbered pixel data and the even numbered pixel data to the data driver 154.

The data driver 154 receives and converts pixel data into first and second data signals by using gamma voltages from a gamma voltage generating unit (not shown). The first and second data signals are supplied to the data lines DL1~DL2m+1 in every ½ horizontal period in which a gate high voltage is supplied to the gate lines GL1~GLn. Particularly, it is required that the data driver 154 supplies the first and second data signals to the liquid crystal cells Clc arranged in zigzag in an up/down direction with reference to a gate line at one horizontal line in every horizontal period.

The gate driver 152 supplies a scan signal, i.e., a gate high voltage to the gate lines GL1~GLn in succession for driving first and second thin film transistors T1 and T2 connected to the gate line. In this instance, odd numbered liquid crystal cells and even numbered column liquid crystal cells positioned on the same horizontal line is either driven by the same one gate line GL or two different gate lines GL.

Figure 3A:
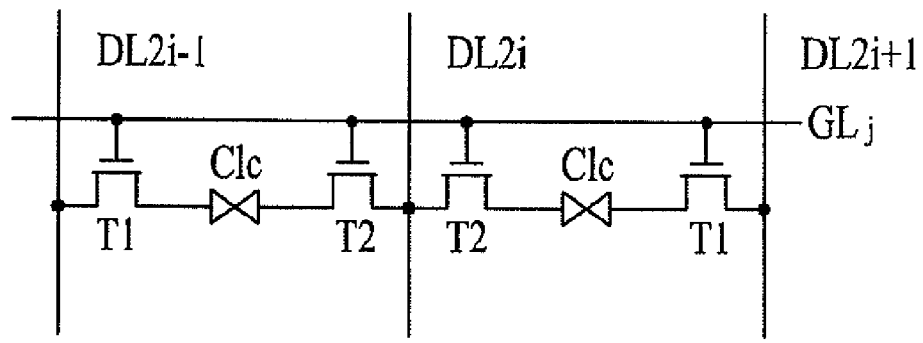
FIG. 3A is a circuit diagram of a horizontal field type liquid crystal display device of the present disclosure illustrating a case odd numbered and even numbered liquid crystal cells positioned on the same horizontal line are driven by the same gate line.

Referring to FIG. 3A, if the odd numbered liquid cell and the even numbered liquid cell are driven by the same one gate line GL, though a number of the gate lines GL can be maintained the same with the related art, the data voltage is higher than the related art.

Figure 3B:
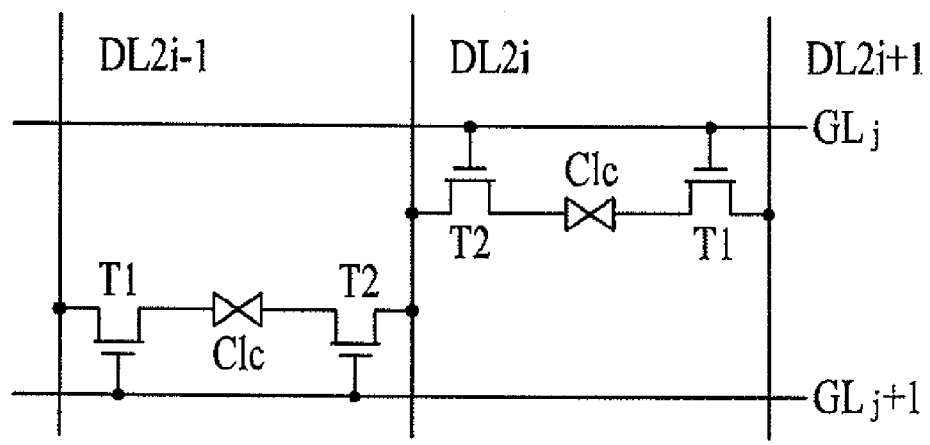
FIG. 3B is a circuit diagram of a horizontal field type liquid crystal display device of the present disclosure illustrating a case odd numbered and even numbered liquid crystal cells positioned on the same horizontal line are driven by gate lines different from each other.

Opposite to this, referring to FIG. 3B, if the odd numbered liquid cell and the even numbered liquid cell are driven by the two different gate lines GL, though a number of the gate drivers 152 increases by two times due to increase of a number of the gate lines GL, a level of the data voltage can be lowered compared to a case the odd numbered liquid cell and the even numbered liquid cell are driven by the same gate line. Accordingly, the liquid crystal display device of the present invention will be described, taking a case the odd numbered liquid cell and the even numbered liquid cell positioned on the same horizontal line are driven by the two different gate lines as an example.

Even if a number of the gate driver 152 which costs lower than the data driver 154 is increased by two times more than the related art, since cost can be saved compared to increase of power consumption of the data driver 154 due to the higher data voltage and rise of cost, it is preferable that the liquid crystal cells on the same horizontal line is driven by the different gate lines GL.

Therefore, since the liquid crystal display device of the present invention requires two times of gate lines compared to the related art, the gate lines are driven by ½ horizontal period. Accordingly, the gate driver 152 of the present invention generates the scan signals in succession in the ½ horizontal period intervals and supplies the scan signals to the gate lines GL.

The liquid crystal display panel 150 has gate lines GL1~GLn, data lines DL1~DL2m+1, liquid crystal cells Clc, first and second thin film transistors T1 and T2, and first and second storage capacitors Cst1, and Cst2.

Figure 4:
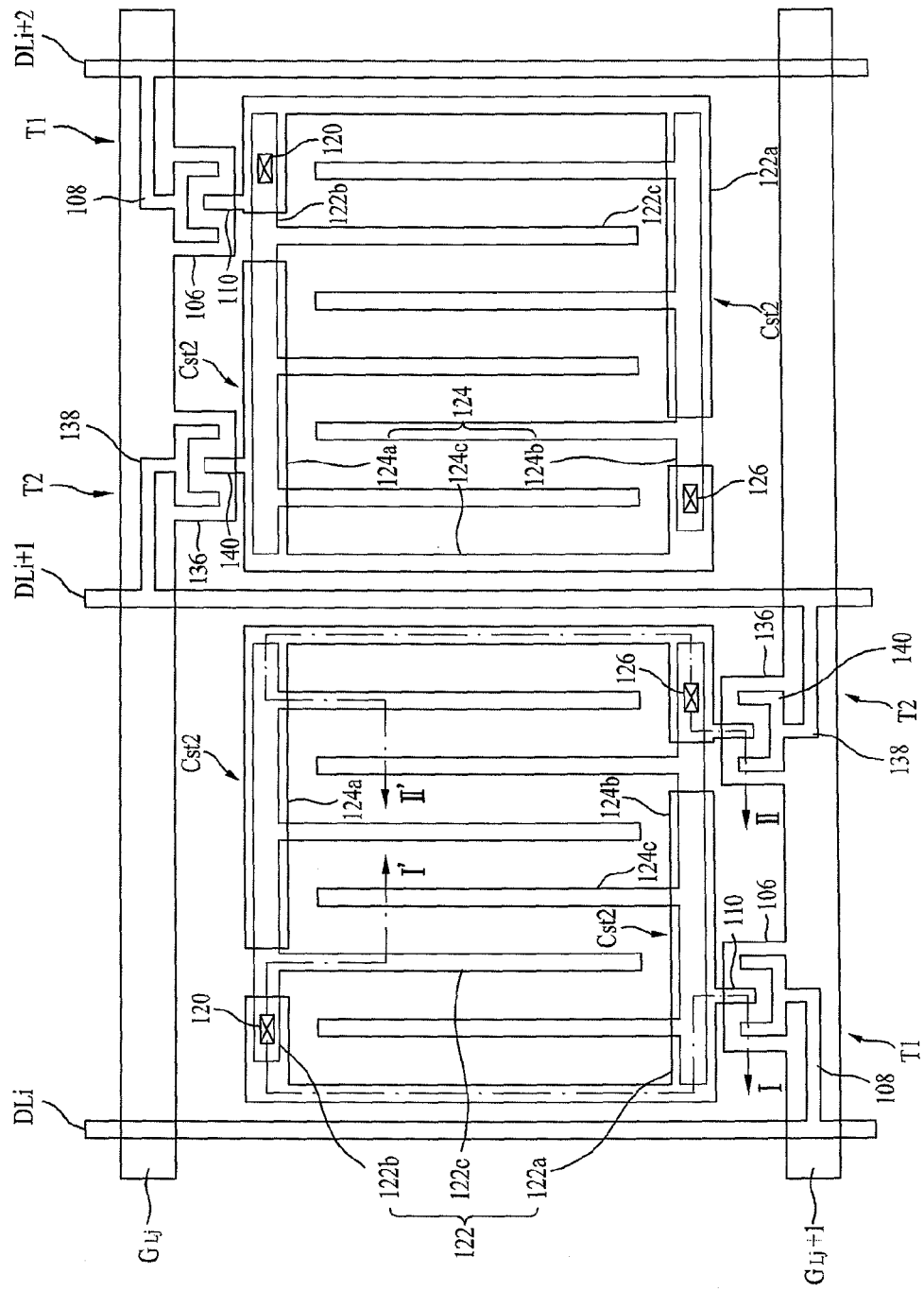
FIG. 4 is a plan view illustrating the liquid crystal display panel shown in FIG. 2.
Figure 5:
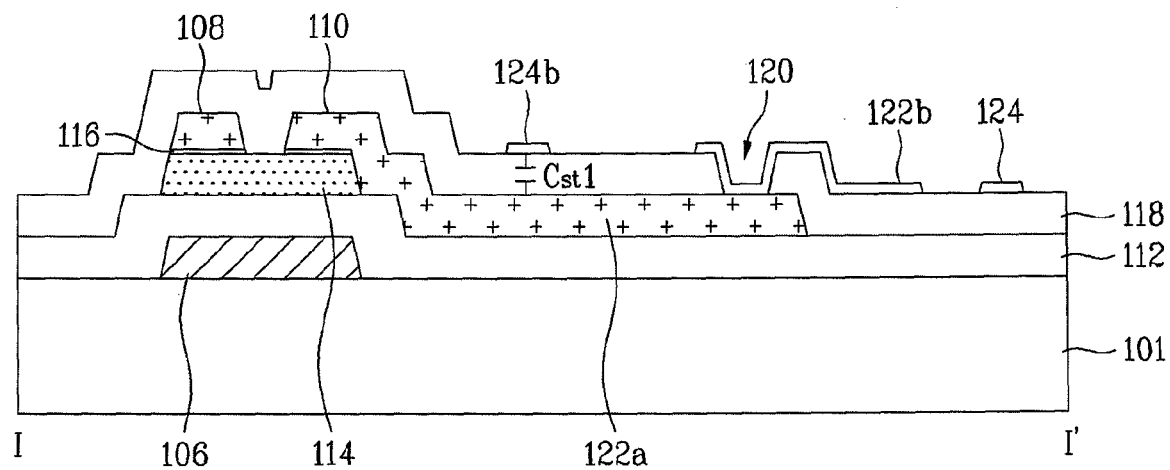
FIG. 5 is sectional views illustrating the liquid crystal display panel cut across lines I-I' and II-II' in FIG. 3, respectively.
Figure 5:
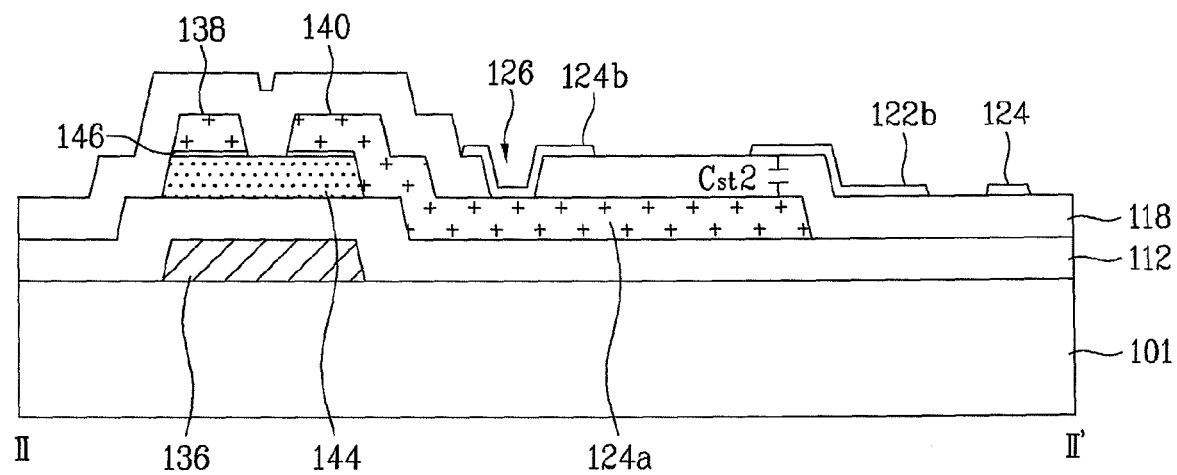

Referring to FIGS. 2 and 4, the gate lines GL1~GLn supply scan signals to gate electrodes 106 and 136 of the first and second thin film transistors T1 and T2.

The data lines DL1~DL2m+1 are formed perpendicular to the gate lines GL1~GLn with a gate insulating film 112 formed between the data lines DL1~DL2m+1 and the gate lines GL1~GLn, to form sub-pixel regions. The data lines DL1~DL2m+1 supply data signals to source electrodes 108 and 140 of the first and second thin film transistors T1 and T2, respectively. In detail, the odd numbered data lines DL1, DL3, . . . , DL2m+1 supply a first data signal to the source electrode 108 of the first thin film transistor T1, and the even numbered data lines DL2, DL4, . . . , DL2m supply the second data signal which forms a voltage difference from the first data signal supplied through the odd numbered data lines DL1, DL3, . . . , DL2m+1 to the source electrode 108 of the second thin film transistor T2. For an example, if the first data signal is a high voltage data signal, the second data signal is a low voltage data signal, and vice versa.

The first thin film transistor T1 has the first data signal, which is supplied to the odd numbered data lines DL1, DL3, . . . , DL2m+1 in response to the scan signal supplied to the gate line GL, charged and maintained at the pixel electrode 122. To do this, the first thin film transistor T1 has a gate electrode 106 connected to the gate line GL, a source electrode 108 connected to the odd numbered data lines DL1, DL3, . . . , DL2m+1, a drain electrode 110 connected to the pixel electrode 122, and an active layer 114 and an ohmic contact layer 116 both form a channel between the source and the drain electrodes 108 and 110.

The second thin film transistor T2 supplies the second data signal, which is supplied to the even numbered data lines DL2, DL4, . . . , DL2m in response to the scan signal to the gate line GL, to the common electrode 124. To do this, the second thin film transistor T2 has a gate electrode 136 connected to the gate line GL, a source electrode 138 connected to the even numbered data lines DL2, DL4, . . . , DL2m, a drain electrode 140 connected to the common electrode 124, and an active layer 144 and an ohmic contact layer 146 both form a channel between the source and the drain electrodes 138 and 140.

The liquid crystal cell Clc is formed at each of the sub-pixel regions, and has a pixel electrode 122 connected to the first thin film transistor T1, and the common electrode 124 connected to the second thin film transistor T2.

The pixel electrode 122 is in contact with the first thin film transistor T1 through a pixel contact hole 120 passed through a protective film. The pixel electrode 122 has the first data signal supplied thereto from the odd numbered data lines DL1, DL3, . . . , DL2m+1 through the first thin film transistor T1. The pixel electrode 122 has a first pixel horizontal portion 122a parallel to the gate line GL, a second pixel horizontal portion 122b opposite and parallel to the first pixel horizontal portion 122a, and pixel finger portions 122c which are extensions each from either the first pixel horizontal portion 122a or the second pixel horizontal portion 122b to the sub-pixel region. In this instance, the first pixel horizontal portion 122a is an extension from the drain electrode 110 of a metal the same with the drain electrode 110 on the gate insulating film 122, the pixel finger portion 122c is a transparent conductive film formed on the protective film 118 for improving aperture, and the second pixel horizontal portion 122b is formed of the same material with the drain electrode 110 or the pixel finger portion 122c.

The common electrode 124 has a common voltage supplied thereto from the even numbered data lines DL2, DL4, ..., DL2m through the second thin film transistor T2. The common electrode 124 has a first common horizontal portion 124 which is an extension from the drain electrode 140 of the second thin film transistor T2 parallel to the gate line GL, a second common horizontal portion 124b opposite and parallel to the first common horizontal portion 124a, and common finger portions 124c which are extensions each from either the first common horizontal portion 124a or the second common horizontal portion 124b to the sub-pixel region. In this instance, the first common horizontal portion 124a is an extension from the drain electrode 110 of a metal the same with the drain electrode 110 on the gate insulating film 122, the common finger portion 124c is a transparent conductive film formed on the protective film 118 for improving aperture, and the second common horizontal portion 124b is formed of the same material with the drain electrode 110 or the pixel finger portion 122c. In the meantime, the first and second common horizontal portions 124a and 124b, the first and second pixel horizontal portions 122a and 122b, the common finger portions 124c, the pixel finger portion 122c may be formed of the same material on the same plane, or at least one thereof may be formed of a material different from others or formed on a plane different from others.

The liquid crystal display device of the present invention forms a horizontal electric field between the pixel finger portion 122c of the pixel electrode having the first data signal supplied thereto and the common finger portion 124c of the common electrode 124 having the second data signal supplied thereto. The horizontal electric field rotates the liquid crystal molecules arranged in a horizontal direction between the thin film transistor substrate and the color filter substrate owing to dielectric anisotropy. As the transmittivity of the light passing through the sub-pixel region varies with an extent of rotation of the liquid crystal molecules, the picture can be produced.

The first and second storage capacitors Cst1 and Cst2 serve to maintain the data voltage charged in the liquid crystal cell until the next data voltage is charged. The first and second storage capacitors Cst1 and Cst2 are connected in parallel for increasing a capacity of entire storage capacitors to improve the aperture.

The first storage capacitor Cst1 is formed as the first pixel horizontal portion 122a is formed overlapped with the second common horizontal portion 124b, with the protective film 118 disposed between the first pixel horizontal portion 122a and the second common horizontal portion 124b, and the second storage capacitor Cst2 is formed as the second pixel horizontal portion 122b is formed overlapped with the first common horizontal portion 124a, with the protective film 118 formed between the second pixel horizontal portion 122b and the first common horizontal portion 124a.

Referring to FIG. 2, in the liquid crystal display device of the present invention, the first thin film transistors T1 connected to the liquid crystal cells are arranged in zigzag with reference to the odd numbered data lines DL1, DL3, ..., DL2m+1 and the second thin film transistors T2 are arranged in zigzag with reference to the even numbered data lines DL2, DL4, ..., DL2m. According to this, the liquid crystal cells on the same horizontal line are driven by the gate lines GL different from each other alternately in view of columns. That is, of the liquid crystal cells on (j)th (j is a natural numeral) horizontal line, while the liquid crystal cells on odd numbered columns are driven by a (2j)th gate line GL2j, the liquid crystal cells on even numbered columns are driven by a (2j−1)th gate line GL2j−1.

In detail, the liquid crystal cells on the odd numbered columns positioned on the same horizontal line are driven by the even numbered gate lines GL2, GL4, .... That is, the first and second thin film transistors T1 and T2 connected to the liquid crystal cells on the odd numbered columns are turned on by the even numbered gate lines GL2, GL4, ..., for supplying the first data voltage from the (2i−1)th (i is a natural numeral) data lines DL1, DL3, ..., DL2m−1 to the pixel electrodes of the liquid crystal cells, and the second data voltage from the (2i)th data lines DL2, DL4, ..., DL2m to the common electrode of the liquid crystal cells.

The liquid crystal cells on the even numbered columns positioned on the same horizontal line are driven by the odd numbered gate lines GL1, GL3, - - - . That is, the first and second thin film transistors T1 and T2 connected to the liquid crystal cells on the even numbered columns are turned on by the odd numbered gate lines GL1, GL3, ..., for supplying the first data voltage from the (2i+1)th data lines DL3, DL5, ..., DL2m+1 to the pixel electrodes of the liquid crystal cells, and the second data voltage from the (2i)th data lines DL2, DL4, ..., DL2m to the common electrode of the liquid crystal cells.

In the meantime, dot inversion type driving of the liquid crystal display device of the present invention will be described.

Figure 6:
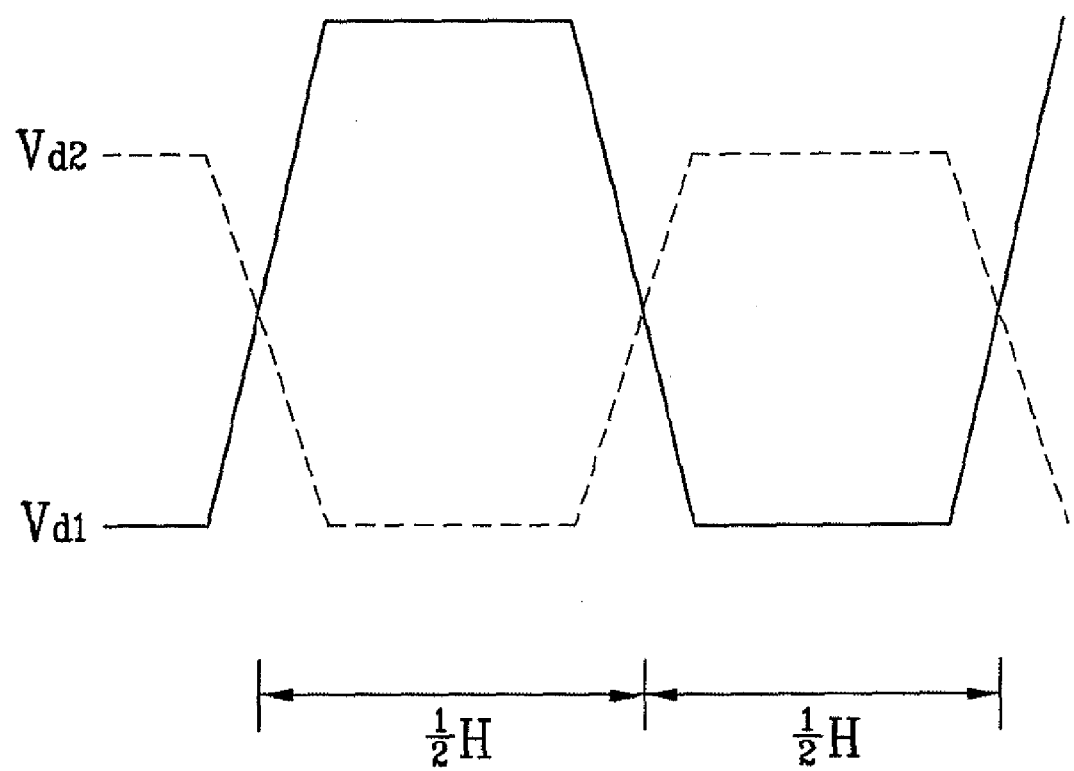
FIG. 6 is wave forms for explaining a method for driving a horizontal field type liquid crystal display device in accordance with an embodiment.

Referring to FIG. 6, during the ½ horizontal period in which the first gate line GL1 is driven in one frame period, the even numbered liquid crystal cells on the first horizontal line have the second data voltage Vd2 supplied through the (2i)th data lines DL2, DL4, ..., DL2m and the first data voltage Vd1 supplied through the (2i+1)th data lines DL3, DL5, ..., DL2m+1. Then, the even numbered liquid crystal cells on the first horizontal line have a negative polarity pixel voltage signal which is equal to a voltage obtainable when the second data voltage Vd2 is subtracted from the first data voltage Vd1 charged therein.

During the ½ horizontal period in which the second gate line GL2 is driven, the odd numbered liquid crystal cells on the first horizontal line have the second data voltage Vd2 supplied through the (2i)th data lines DL2, DL4, ..., DL2m and the first data voltage Vd1 supplied through the (2i−1)th data lines DL1, DL3, ..., DL2m−1. Then, the odd numbered liquid crystal cells on the first horizontal line have a positive polarity pixel voltage signal which is equal to a voltage obtainable when the first data voltage Vd1 is subtracted from the second data voltage Vd2 charged therein.

During the ½ horizontal period in which the third gate line GL3 is driven, the even numbered liquid crystal cells on the second horizontal line have the second data voltage Vd2 supplied through the (2i)th data lines DL2, DL4, ..., DL2m and the first data voltage Vd1 supplied through the (2i+1)th data lines DL3, DL5, ..., DL2m+1. Then, the even numbered liquid crystal cells on the second horizontal line have a negative polarity pixel voltage signal which is equal to a voltage obtainable when the first data voltage Vd1 is subtracted from the second data voltage Vd2 charged therein.

During the ½ horizontal period in which the fourth gate line GL4 is driven, the odd numbered liquid crystal cells on the second horizontal line have the second data voltage Vd2 supplied through the (2i)th data lines DL2, DL4, ..., DL2m and the first data voltage Vd1 supplied through the (2i−1)th data lines DL1, DL3, ..., DL2m−1. Then, the odd numbered liquid crystal cells on the second horizontal line have a positive polarity pixel voltage signal which is equal to a voltage obtainable when the second data voltage Vd2 is subtracted from the first data voltage Vd1 charged therein. According to this, the liquid crystal display panel is driven by the dot inversion type.

In the next frame period, during the ½ horizontal period in which the first gate line GL1 is driven in one frame period, the even numbered liquid crystal cells on the first horizontal line have the first data voltage Vd1 supplied through the (2i)th data lines DL2, DL4, ..., DL2m and the second data voltage Vd2 supplied through the (2i+1)th data lines DL3, DL5, ..., DL2m+1. Then, the even numbered liquid crystal cells on the first horizontal line have a positive polarity pixel voltage signal which is equal to a voltage obtainable when the first data voltage Vd1 is subtracted from the second data voltage Vd2 charged therein.

During the ½ horizontal period in which the second gate line GL2 is driven, the odd numbered liquid crystal cells on the first horizontal line have the first data voltage Vd1 supplied through the (2i)th data lines DL2, DL4, ..., DL2m and the second data voltage Vd2 supplied through the (2i−1)th data lines DL1, DL3, ..., DL2m−1. Then, the odd numbered liquid crystal cells on the first horizontal line have a negative polarity pixel voltage signal which is equal to a voltage obtainable when the second data voltage Vd2 is subtracted from the first data voltage Vd1 charged therein.

During the ½ horizontal period in which the third gate line GL3 is driven, the even numbered liquid crystal cells on the second horizontal line have the first data voltage Vd1 supplied through the (2i)th data lines DL2, DL4, ..., DL2m and the second data voltage Vd2 supplied through the (2i+1)th data lines DL3, DL5, ..., DL2m+1. Then, the even numbered liquid crystal cells on the second horizontal line have a positive polarity pixel voltage signal which is equal to a voltage obtainable when the second data voltage Vd2 is subtracted from the first data voltage Vd1 charged therein.

During the ½ horizontal period in which the fourth gate line GL4 is driven, the odd numbered liquid crystal cells on the second horizontal line have the first data voltage Vd1 supplied through the (2i)th data lines DL2, DL4, ..., DL2m and the second data voltage Vd2 supplied through the (2i−1)th data lines DL1, DL3, ..., DL2m−1. Then, the odd numbered liquid crystal cells on the second horizontal line have a negative polarity pixel voltage signal which is equal to a voltage obtainable when the first data voltage Vd1 is subtracted from the second data voltage Vd2 charged therein. According to this, the liquid crystal display panel is driven by the dot inversion type.

Thus, owing to alternation of the second data voltage which is the common voltage in the related art, the liquid crystal display device of the present invention can drop a level of the first data voltage which is the data voltage in the related art by ½. Eventually, the drop of the reference voltage VDD which is required for generating the data voltage by ½ of the related art enables to reduce power consumption as well as the cost of the data driver.

The pulse mode driving of the second data voltage which is the common voltage in the related art enables to control the second data voltage to the liquid crystal cells at different positions.

Moreover, since the supply of the second data voltage which is the common voltage in the related art to the liquid crystal cells through the even numbered data line enables to dispense with the common line. According to this, the liquid crystal display device of the present invention can increase an aperture.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A liquid crystal display device comprising:
a liquid crystal display panel having liquid crystal cells;
a gate driver that drives gate lines of the liquid crystal display panel;
a data driver that drives a first to (2m+1)th data lines of the liquid crystal display panel,
wherein the liquid crystal display panel includes;
first thin film transistors connected to odd numbered data lines arranged on each horizontal line in zigzag with reference to the odd numbered data lines,
second thin film transistors connected to even numbered data lines arranged on each horizontal line in zigzag with reference to the even numbered data lines,
a pixel electrode connected to the first thin film transistors that supply a first data signal thereto through the odd numbered data lines, and
a common electrode connected to the second thin film transistor that supplies a second data signal thereto through the even numbered data line and forms a horizontal electric field together with the pixel electrode.

2. The device as claimed in claim 1, wherein the liquid crystal cell has a difference of voltages between the first and the second data signals charged therein, and the first and the second data signals alternate in every horizontal period.

3. The device as claimed in claim 1, wherein the first data signal is supplied to third to (2m+1)th data lines in ½ horizontal period of one horizontal period, and to first to (2m−1)th data lines in rest of the ½ horizontal period of one horizontal period.

4. The device as claimed in claim 1, wherein, of the liquid crystal cells on the jth horizontal line, some of the liquid crystal cells of the odd numbered and even numbered liquid crystal cells are connected to the (2i−1)th gate lines, and the rest of the liquid crystal cells are connected to the (2i)th gate lines.

5. The device as claimed in claim 1, wherein the pixel electrode includes;
a first pixel horizontal portion parallel to the gate line,
a second pixel horizontal portion opposite to the first pixel horizontal portion, and
pixel finger portions connected to either the first pixel horizontal portion or the second pixel horizontal portion, and
the common electrode includes;
a first common horizontal portion overlapped with the second pixel horizontal portion with at least one insulating film disposed therebetween to form a first storage capacitor,
a second common horizontal portion overlapped with the first pixel horizontal portion with at least one insulating film disposed therebetween to form a second storage capacitor connected in parallel with the first storage capacitor, and
common finger portions connected to either the first common horizontal portion or the second common horizontal portion to position alternately with the pixel finger portions.

6. The device as claimed in claim 5, wherein both the pixel finger portions and the common finger portions are transparent conductive films, and the first and second pixel horizontal portions and the first and second common horizontal portions are formed of a material the same or different from the pixel finger portions and the common finger portions.

* * * * *